(12) United States Patent
Jeon et al.

(10) Patent No.: US 8,361,660 B2
(45) Date of Patent: Jan. 29, 2013

(54) NON-AQUEOUS ELECTROLYTE SOLUTION FOR LITHIUM SECONDARY BATTERY AND LITHIUM SECONDARY BATTERY COMPRISING THE SAME

(75) Inventors: Jong-Ho Jeon, Daejeon (KR);
Yong-Gon Lee, Daejeon (KR);
Seung-Woo Chu, Markham (CA);
Shul-Kee Kim, Daejeon (KR);
Hyun-Yeong Lee, Cheongju-si (KR);
Jae-Deok Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/164,107

(22) Filed: Jun. 20, 2011

(65) Prior Publication Data

US 2011/0244339 A1  Oct. 6, 2011

Related U.S. Application Data

(63) Continuation of application No. PCT/KR2010/007060, filed on Oct. 14, 2010.

(30) Foreign Application Priority Data

Jan. 15, 2010 (KR) .................. 10-2010-0003970

(51) Int. Cl.
*H01M 6/16* (2006.01)
(52) U.S. Cl. .................. 429/324; 429/326; 429/330
(58) Field of Classification Search .................. 429/324, 429/326, 330
See application file for complete search history.

(56) References Cited

U.S. PATENT DOCUMENTS

| 7,223,502 | B2 | 5/2007 | Onuki | |
|---|---|---|---|---|
| 2006/0078792 | A1* | 4/2006 | Kim et al. | ............ 429/200 |
| 2008/0090153 | A1 | 4/2008 | Kim et al. | |
| 2008/0118843 | A1 | 5/2008 | Tarnopolsky | |
| 2009/0068565 | A1 | 3/2009 | Lee | |
| 2009/0136846 | A1 | 5/2009 | Lee et al. | |

FOREIGN PATENT DOCUMENTS

| JP | 2005243490 A | * | 9/2005 |
|---|---|---|---|
| KR | 10-0635704 B1 | | 10/2006 |
| KR | 10-0760763 B1 | | 10/2007 |
| KR | 10-0811917 B1 | | 3/2008 |
| KR | 10-0913176 B1 | | 8/2009 |
| KR | 2011083930 A | * | 7/2011 |

* cited by examiner

*Primary Examiner* — Carlos Barcena
(74) *Attorney, Agent, or Firm* — Birch, Stewart, Kolasch & Birch, LLP

(57) ABSTRACT

Disclosed are a non-aqueous electrolyte solution for a lithium secondary battery and a lithium secondary battery comprising the same. The non-aqueous electrolyte solution for a lithium secondary battery may include difluorotoluene having a lowest oxidation potential among components of the non-aqueous electrolyte solution. The lithium secondary battery may have improvement in basic performance including high rate charge/discharge characteristics, cycle life characteristics, and the like, and may remarkably reduce swelling caused by decomposition of an electrolyte solution under high voltage conditions such as overcharge.

9 Claims, No Drawings

NON-AQUEOUS ELECTROLYTE SOLUTION FOR LITHIUM SECONDARY BATTERY AND LITHIUM SECONDARY BATTERY COMPRISING THE SAME

CROSS-REFERENCE TO RELATED APPLICATION

This application is a continuation of International Application No. PCT/KR2010/007060 filed on Oct. 14, 2010, which claims priority to Korean Patent Application No. 10-2010-0003970 filed in Republic of Korea on Jan. 15, 2010, the entire contents of which are incorporated herein by reference.

BACKGROUND OF THE INVENTION

1. Field of the Invention

The present invention relates to a non-aqueous electrolyte solution for a lithium secondary battery and a lithium secondary battery comprising the same.

2. Description of the Related Art

Recently, interest in electrochemical devices is increasing day by day. As the electrochemical devices are extensively applied to mobile phones, camcorders, and notebook computers, and further to electric vehicles or hybrid electric vehicles, the demand for high energy densification is increasing in the field of electrochemical devices used as a power source of such electronic appliances. Lithium secondary batteries are the most suitable to meet the demand, and thus, their study is being made actively at present.

Among the currently available secondary batteries, lithium secondary batteries developed in the early 1990's comprise an anode of a carbon material capable of intercalating and disintercalating lithium ions, a cathode of lithium-containing oxide, and a non-aqueous electrolyte solution having a proper amount of lithium salt dissolved in an organic solvent.

The lithium secondary batteries generally have an average discharge voltage between about 3.6V to about 3.7V, and thus, they advantageously have a higher discharge voltage than alkali batteries, nickel-cadmium batteries, and the like. To exhibit such a high operating voltage, it needs an electrolyte solution composition which is electrochemically stable in a charge/discharge voltage range between 0 to 4.2V. For this purpose, a non-aqueous electrolyte solution uses, as an organic solvent, a mixed solvent in which a cyclic carbonate compound such as ethylene carbonate, propylene carbonate, and the like, is properly mixed with a linear carbonate compound such as dimethyl carbonate, ethylmethyl carbonate, diethyl carbonate, and the like.

The organic solvent has a low flash point and a high degree of burning performance, which may affect safety of lithium secondary batteries. In particular, when batteries are exposed to high voltage conditions such as overcharge caused by malfunction of a charger or carelessness of a user, the organic solvent gets in contact with a cathode or an anode and it decomposes, resulting in a heat generating reaction accompanying gas generation. As a result, batteries may have an increase in thickness, which may cause a problem during setup of mobile phones or notebook computers, or batteries may suffer from inner pressure increase and thermal runaway, resulting in explosion or firing.

To solve the above problems, non-aqueous electrolyte solutions containing a variety of additives have been suggested. For example, batteries including an electrolyte solution containing 4-Chlorotoluene (4CT) have been developed to reduce gas generation when overcharged. However, the exemplary additive was designated as an environmentally hazardous substance and impossible to commercialize. Accordingly, there is a need for an additive that replaces the conventional additive.

U.S. Pat. No. 7,223,502 discloses a non-aqueous electrolyte solution containing a variety of fluorine-containing aromatic compounds for suppression of gas generation. Also, Korean Patent Publication No. 2006-0029748 teaches a non-aqueous electrolyte solution containing various kinds of halogenated toluene for improving overcharge characteristics. These papers merely mention difluorotoluene as one of additives, however they do not suggest or specify remarkable effects of difluorotoluene for inhibition of decomposition of a non-aqueous electrolyte solvent.

Meanwhile, Korean Patent No. 0760763 discloses a non-aqueous electrolyte solution containing halogenated biphenyl and dehalogenated toluene for ensuring overcharge safety of a battery. However, this document does not suggest or specify remarkable effects of difluorotoluene for inhibition of decomposition of a non-aqueous electrolyte solvent. Like this art, when halogenated biphenyl and difluorotoluene are simultaneously added to a non-aqueous electrolyte solution, halogenated biphenyl having a lower oxidation potential first covers a cathode to form a thin film which hinders oxidation of difluorotoluene at the cathode. Accordingly, thin-film formation of difluorotoluene on an anode is hindered, and as a result, a function of difluorotoluene for preventing decomposition of an organic solvent is remarkably reduced when overcharged.

SUMMARY OF THE INVENTION

The present invention is designed to solve the above-described problems, and therefore, it is an object of the present invention to provide a non-aqueous electrolyte solution for a lithium secondary battery which may enhance basic performance of a battery including high rate charge/discharge characteristics, cycle life characteristics, and the like, and may prevent a battery from swelling by suppressing decomposition of an electrolyte solution under high voltage conditions such as overcharge, and a lithium secondary battery comprising the same.

In order to achieve the above object, the present invention provides a non-aqueous electrolyte solution for a lithium secondary battery including a lithium salt and an organic solvent. The non-aqueous electrolyte solution of the present invention may further include difluorotoluene, represented by the following chemical formula 1, having a lowest oxidation potential difluorotoluene among components of the non-aqueous electrolyte solution,

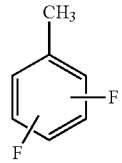

<Chemical formula 1> where the position of fluorine may be at least one selected from the group consisting of 2,3-, 2,4-, 2,5-, 2,6-, 3,4-, and 3,5-. In particular, when the position of fluorine is any one of 2,5-, 3,4-, and 3,5-, swelling of a battery under high voltage conditions such as overcharge is remarkably reduced.

In the non-aqueous electrolyte solution of the present invention, the content of difluorotoluene is preferably 0.1 to 20 weight %, more preferably, 1 to 15 weight %, per the total weight of the non-aqueous electrolyte solution.

In the non-aqueous electrolyte solution of the present invention, the organic solvent is preferably a carbonate-based organic solvent, in particular, a mixture of cyclic carbonate and linear carbonate. The cyclic carbonate may be ethylene carbonate, propylene carbonate, fluoroethylene carbonate, or butylene carbonate, singularly or in combination. The linear carbonate may be dimethyl carbonate, diethyl carbonate, methylethyl carbonate, methylpropyl carbonate, or dipropyl carbonate, singularly or in combination.

Also, the non-aqueous electrolyte solution of the present invention preferably further includes vinylene carbonate or a sultone-based compound, singularly or in combination.

The above-described non-aqueous electrolyte solution for a lithium secondary battery is usefully applied to a typical lithium secondary battery comprising an anode and a cathode.

EFFECTS OF THE INVENTION

When a battery is exposed to high voltage conditions such as overcharge due to malfunction of a charger or carelessness of a user, difluorotoluene in contained in the non-aqueous electrolyte solution according to the present invention is oxidized earlier than an organic solvent to form a thin film on an anode, whereby gas generation resulted from decomposition of the organic solvent is remarkably reduced. Accordingly, problems that may occur during setup of mobile phones or notebook computers due to increased thickness of a battery, or likelihood of explosion or firing caused by inner pressure increase and thermal runaway of a battery may be prevented.

Also, a lithium secondary battery comprising the non-aqueous electrolyte solution for a lithium secondary battery according to the present invention may enhance basic performance of a battery including high rate charge/discharge characteristics, cycle life characteristics, and the like.

BEST MODE

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A non-aqueous electrolyte solution for a lithium secondary battery according to the present invention includes a lithium salt and an organic solvent, and further includes difluorotoluene, represented by the following chemical formula 1, having a lowest oxidation potential of difluorotoluene among components of the non-aqueous electrolyte solution.

<Chemical formula 1>

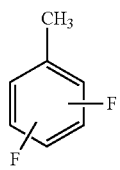

where the position of fluorine is at least one selected from the group consisting of 2,3-, 2,4-, 2,5-, 2,6-, 3,4-, and 3,5-. That is, difluorotoluene represented by the chemical formula 1 may use 2,3-difluorotoluene, 2,4-difluorotoluene, 2,5-difluorotoluene, 2,6-difluorotoluene, 3,4-difluorotoluene, or 3,5-difluorotoluene, singularly or in combination. In particular, it is found that when the position of fluorine is any one of 2,5-, 3,4-, and 3,5-, swelling of a battery under high voltage conditions such as overcharge is remarkably reduced.

As described above, the conventional arts disclose non-aqueous electrolyte solutions including a variety of halogen-containing aromatic compounds to suppress gas generation caused by decomposition of an electrolyte solution. However, the conventional arts merely mentioned difluorotoluene as one of a variety of halogen-containing aromatic compounds, and they did not actually use difluorotoluene as a halogen-containing aromatic compound. Also, the conventional arts did not suggest or specify the remarkable effects of difluorotoluene for inhibition of decomposition of a non-aqueous solvent. According to the conventional arts, it was found that the used fluorine-substituted aromatic compounds did not reduce gas generation to a desired level when overcharged. That is, it was found that when overcharge continues, an amount of gas generated in the presence of these compounds reached a level sufficient to open a vent intended for safety of a battery. This is a fatal drawback under the existing circumstances in which safety of a battery is raised as a great issue.

The inventors believed that compared with a lithium secondary battery containing a monofluorotoluene compound or other halogen-containing toluene compounds, a lithium secondary battery including a non-aqueous electrolyte solution containing a difluorotoluene compound of the above chemical formula 1 remarkably reduces swelling that may occur under high voltage conditions such as overcharge, thereby ensuring safety of the battery, and they completed the present invention based on the belief.

According to the present invention, difluorotoluene contained in the non-aqueous electrolyte solution is oxidized earlier than an organic solvent to form a thin film on an anode under high voltage conditions such as overcharge, and thus, difluorotoluene has an excellent effect of preventing decomposition of the organic solvent. That is, difluorotoluene of the above chemical formula 1 contained in the non-aqueous electrolyte solution is oxidized to aldehyde by reaction with a cathode overcharged with a methyl ($CH_3$) group as a substituent, which is prior to an oxidation reaction of the organic solvent, thereby preventing decomposition of the organic solvent. Also, the resulting aldehyde compound is reduced at an anode to form a reactive resin phase thin-film on the anode, thereby preventing further decomposition of the organic solvent caused by a reaction with the anode. With regard to decomposition suppressing performance of the organic solvent, difluorotoluene of the above chemical formula 1 is better than a monofluorotoluene compound or other halogen-containing toluene compounds. In particular, when the position of fluorine is any one of 2,5-, 3,4-, and 3,5-, swelling of a battery occurring under high voltage conditions such as overcharge is remarkably reduced. As described above, it is found that difluorotoluene remarkably suppresses gas generation, among a plenty of fluorine-substituted aromatic compounds based on one aromatic structure. This means that safety against overcharge is significantly affected only by the substitution number of fluorine atoms, which was not anticipated by an ordinary person skilled in the art. This effect is increased depending on the substitution position of fluorine atoms.

In the non-aqueous electrolyte solution of the present invention, an oxidation potential of difluorotoluene should be lowest among components of the non-aqueous electrolyte solution. The oxidation potential represents a potential when an oxidation reaction of the non-aqueous electrolyte solution starts, that is, a voltage when a decomposition reaction of the non-aqueous electrolyte solution initiates. Accordingly, the oxidation potential of the non-aqueous electrolyte solution is determined by a component having the lowest oxidation potential among components of the non-aqueous electrolyte solution.

To make good use of a function of difluorotoluene of the above chemical formula 1 under high voltage conditions such as overcharge, difluorotoluene of the above chemical formula 1 should be oxidized earliest. As disclosed in an embodiment of Korean Patent No. 0760763, when difluorotoluene of the above chemical formula 1 is used together with halogenated toluene, biphenyl, cyclohexylbenzene, and the like, the latter materials are oxidized under overcharge conditions to form a thin film on a cathode earlier than difluorotoluene, thereby hindering an oxidation reaction of difluorotoluene of the above chemical formula 1. It results in reduction in a function for suppressing the decomposition of an organic solvent. Accordingly, the non-aqueous electrolyte solution of the present invention does not include a compound having a lower oxidation potential than difluorotoluene of the above chemical formula 1. That is, the oxidation potential of difluorotoluene of the above chemical formula 1 is lowest among components of the non-aqueous electrolyte solution.

In the non-aqueous electrolyte solution of the present invention, the content of difluorotoluene is preferably 0.1 to 20 weight %, more preferably, 1 to 15 weight %, per the total weight of the non-aqueous electrolyte solution. When the content is less than 0.1 weight %, effects of preventing gas generation under overcharge conditions may be insufficient. When the content is more than 20 weight %, battery performance such as rate characteristics may be deteriorated because an amount of lithium ions to be dissociated is affected.

In the non-aqueous electrolyte solution of the present invention, the organic solvent is preferably a carbonate-based organic solvent, in particular, a mixture of cyclic carbonate and linear carbonate. The cyclic carbonate may be ethylene carbonate, propylene carbonate, fluoroethylene carbonate, or butylene carbonate, singularly or in combination. The linear carbonate may be dimethyl carbonate, diethyl carbonate, methylethyl carbonate, methylpropyl carbonate, or dipropyl carbonate, singularly or in combination. Other well-known organic solvents may be used within the range not departing from the object of the present invention.

The lithium salt contained as an electrolyte is not limited to a specific type of lithium salt, but may include, without limitation, typical ones used in a non-aqueous electrolyte solution for a lithium secondary battery. As a representative example, the lithium salt may be $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, or $LiC_4BO_8$, singularly or in combination. Preferably, the concentration of the lithium salt in the non-aqueous electrolyte solution is between 0.7 and 2.0 mole.

Also, the non-aqueous electrolyte solution of the present invention preferably includes vinylene carbonate, or a sultone-based compound such as 1,3-propane sultone, singularly or in combination, to enhance cycle life characteristics and prevent reduction in battery performance.

The above-described non-aqueous electrolyte solution of the present invention is applied to a typical lithium secondary battery comprising an anode and a cathode.

The anode is not limited to a specific type of anode if it is capable of intercalating and disintercalating lithium ions, and for example, may include metal materials such as lithium metals, lithium alloys, and the like, and carbon materials such as low crystallinity carbon, high crystallinity carbon, and the like. Representatively, the low crystallinity carbon includes soft carbon and hard carbon, and the high crystallinity carbon includes high-temperature plasticity carbon such as natural carbon, Kish graphite, pyrolytic carbon, mesophase pitch based carbon fiber, meso-carbon microbeads, Mesophase pitches, petroleum or coal tar pitch derived cokes, and the like. In addition, well-known anodes may be silicon-containing alloys or oxides such as $LiTi_5O_{12}$. In this instance, the anode may include a binder, and the binder may include various kinds of binder polymers such as vinylidenefluoride-hexafluoropropylene copolymer (PVDF-co-HFP), polyvinylidenefluoride, polyacrylonitrile, polymethylmethacrylate, styrene-butadiene rubber (SBR), and the like.

The cathode is not limited to a specific type of cathode if it is capable of intercalating and disintercalating lithium ions, and may preferably include lithium-containing transition metal oxides, for example, at least one selected from the group consisting of $LiCoO_2$, $LiNiO_2$, $LiMnO_2$, $LiMn_2O_4$, $Li(Ni_aCo_bMn_c)O_2$ ($0<a<1, 0<b<1, 0<c<1, a+b+c=1$), $LiNi_{1-y}Co_yO_2(0<y<1)$, $LiCo_{1-y}Mn_yO_2(0<y<1)$, $LiNi_{1-y}Mn_yO_2$ ($0\leq y<1$), $Li(Ni_aCo_bMn_c)O_4(0<a<2, 0<b<2, 0<c<2, a+b+c=2)$, $LiMn_{2-z}Ni_zO_4(0<z<2)$, $LiMn_{2-z}Co_zO_4(0<z<2)$, $LiCoPO_4$, and $LiFePO_4$.

A typical separator may be interposed between the cathode and the anode. The separator may be manufactured using a porous polymer film, singularly or in multiples, that is made of, for example, polyolefin-based polymers such as ethylene polymer, propylene polymer, ethylene-butene copolymer, ethylene-hexene copolymer, ethylene-methacrylate copolymer, and the like. In addition, the separator may be a porous non-woven fabric, for example, a non-woven fabric made of high melting point glass fibers, polyethyleneterephthalate fibers, and the like, however the present invention is not limited in this regard.

The lithium secondary battery of the present invention may have various types using a metallic can, including, but not limited to, a cylindrical type, a prismatic type, a pouch type, a coin type, and the like.

MODE FOR THE INVENTION

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Comparative Example 1

1M $LiPF_6$ was dissolved in a mixed organic solvent having ethylene carbonate (EC):ethylmethyl carbonate (EMC):diethylcarbonate (DEC)=3:4:3 (volume %), to prepare a non-aqueous electrolyte solution. Subsequently, 2 weight % of vinylene carbonate (VC) and 3 weight % of 1,3-propane sultone (PS) were added thereto, per the total weight of the non-aqueous electrolyte solution.

Comparative Example 2

A non-aqueous electrolyte solution was prepared in the same way as comparative example 1, except that 5 weight % of 2-chlorotoluene was further added thereto, per the total weight of the non-aqueous electrolyte solution.

Comparative Example 3

A non-aqueous electrolyte solution was prepared in the same way as comparative example 1, except that 5 weight % of 3-chlorotoluene was further added thereto, per the total weight of the non-aqueous electrolyte solution.

Comparative Example 4

A non-aqueous electrolyte solution was prepared in the same way as comparative example 1, except that 5 weight % of 4-chlorotoluene was further added thereto, per the total weight of the non-aqueous electrolyte solution.

Comparative Example 5

A non-aqueous electrolyte solution was prepared in the same way as comparative example 1, except that 5 weight % of 2-fluorotoluene was further added thereto, per the total weight of the non-aqueous electrolyte solution.

Comparative Example 6

A non-aqueous electrolyte solution was prepared in the same way as comparative example 1, except that 5 weight % of 3-fluorotoluene was further added thereto, per the total weight of the non-aqueous electrolyte solution.

Comparative Example 7

A non-aqueous electrolyte solution was prepared in the same way as comparative example 1, except that 5 weight % of 4-fluorotoluene was further added thereto, per the total weight of the non-aqueous electrolyte solution.

Comparative Example 8

A non-aqueous electrolyte solution was prepared in the same way as comparative example 1, except that 5 weight % of 3,5-difluorotoluene and 1 weight % of fluorobiphenyl were further added thereto, per the total weight of the non-aqueous electrolyte solution.

Comparative Example 9

A non-aqueous electrolyte solution was prepared in the same way as comparative example 1, except that 5 weight % of 3,5-difluorotoluene and 1 weight % of cyclohexylbenzene were further added thereto, per the total weight of the non-aqueous electrolyte solution.

Comparative Example 10

A non-aqueous electrolyte solution was prepared in the same way as comparative example 1, except that 5 weight % of 3,5-difluorotoluene and 1 weight % of biphenyl were further added thereto, per the total weight of the non-aqueous electrolyte solution.

Comparative Example 11

A non-aqueous electrolyte solution was prepared in the same way as comparative example 1, except that 5 weight % of 3,4,6-trifluorotoluene was further added thereto, per the total weight of the non-aqueous electrolyte solution.

Example 1

A non-aqueous electrolyte solution was prepared in the same way as comparative example 1, except that 5 weight % of 2,3-difluorotoluene was further added thereto, per the total weight of the non-aqueous electrolyte solution.

Example 2

A non-aqueous electrolyte solution was prepared in the same way as comparative example 1, except that 5 weight % of 2,4-difluorotoluene was further added thereto, per the total weight of the non-aqueous electrolyte solution.

Example 3

A non-aqueous electrolyte solution was prepared in the same way as comparative example 1, except that 5 weight % of 2,5-difluorotoluene was further added thereto, per the total weight of the non-aqueous electrolyte solution.

Example 4

A non-aqueous electrolyte solution was prepared in the same way as comparative example 1, except that 5 weight % of 2,6-difluorotoluene was further added thereto, per the total weight of the non-aqueous electrolyte solution.

Example 5

A non-aqueous electrolyte solution was prepared in the same way as comparative example 1, except that 5 weight % of 3,4-difluorotoluene was further added thereto, per the total weight of the non-aqueous electrolyte solution.

Example 6

A non-aqueous electrolyte solution was prepared in the same way as comparative example 1, except that 5 weight % of 3,5-difluorotoluene was further added thereto, per the total weight of the non-aqueous electrolyte solution.

Example 7

A non-aqueous electrolyte solution was prepared in the same way as comparative example 1, except that 1 weight % of 3,5-difluorotoluene was further added thereto, per the total weight of the non-aqueous electrolyte solution.

Example 8

A non-aqueous electrolyte solution was prepared in the same way as comparative example 1, except that 10 weight % of 3,5-difluorotoluene was further added thereto, per the total weight of the non-aqueous electrolyte solution.

Example 9

A non-aqueous electrolyte solution was prepared in the same way as comparative example 1, except that 15 weight % of 3,5-difluorotoluene was further added thereto, per the total weight of the non-aqueous electrolyte solution.

Method for Evaluating Initial Performance and Life of Battery

Prismatic type batteries were manufactured using a LiCoO$_2$ cathode and an artificial graphite anode, and were filled with the non-aqueous electrolyte solutions according to examples and comparative examples. In this instance, 80% of required injection amount of the non-aqueous electrolyte solution was first injected, followed by charging at 0.2 C-rate for 50 minutes, and the remaining amount, that is, 20% of the non-aqueous electrolyte solution was injected, followed by sealing. After the manufactured batteries were aged at room temperature for 2 days, the batteries were gone through initial charge/discharge, that is, charging at 0.2 C under constant current constant voltage conditions at room temperature until the voltage becomes 4.2V, and discharging at 0.2 C under constant current conditions until the voltage becomes 3.0V. The charge capacity and the discharge capacity were measured, and a ratio of charge capacity to discharge capacity, also called an initial charge/discharge efficiency, was calculated. Subsequent to initial charge/discharge, charge/discharge was carried out at 1.0 C-rate in the same voltage range at room temperature (23° C.) and at high temperature (45° C.) each 400 times. A capacity retention ratio after 400 cycles was calculated based on initial discharge capacity, and the results are shown in the following table 1.

Method for Evaluating Overcharge

The discharged batteries after initial charge/discharge as described above was overcharged to 5.25 cut-off voltage at 550 mA current for 24 hours. The thickness before and after overcharge was measured, and the changes in thickness were shown in the following table 1.

TABLE 1

|  | Initial charge/discharge efficiency (%) | Cycle life characteristics (%) at room temperature (23° C.) | Cycle life characteristics (%) at high temperature (45° C.) | Thickness change after overcharge (mm) |
|---|---|---|---|---|
| Comparative example 1 | 92.1% | 83.5% | 78.5% | Vent |
| Comparative example 2 | 92.2% | 83.2% | 79.2% | 6.12 |
| Comparative example 3 | 91.9% | 83.7% | 79.0% | 5.78 |
| Comparative example 4 | 92.2% | 83.5% | 78.5% | 5.92 |
| Comparative example 5 | 92.1% | 82.6% | 79.1% | Vent |
| Comparative example 6 | 92.1% | 83.5% | 79.3% | Vent |
| Comparative example 7 | 92.3% | 83.4% | 79.0% | Vent |
| Comparative example 8 | 91.8% | 83.1% | 74.6% | Vent |
| Comparative example 9 | 91.8% | 78.6% | 51.1% | Vent |
| Comparative example 10 | 91.7% | 65.3% | 33.4% | Vent |
| Comparative example 11 | 92.0% | 82.3% | 78.7% | 5.97 |
| Example 1 | 92.2% | 83.6% | 80.1% | 4.66 |
| Example 2 | 92.3% | 83.4% | 79.8% | 4.73 |
| Example 3 | 92.2% | 82.5% | 81.2% | 4.12 |
| Example 4 | 92.0% | 83.7% | 80.5% | 5.25 |
| Example 5 | 92.4% | 83.0% | 78.9% | 3.89 |
| Example 6 | 92.0% | 83.1% | 80.1% | 4.33 |
| Example 7 | 92.1% | 83.4% | 79.2% | 5.87 |
| Example 8 | 92.0% | 82.4% | 77.9% | 4.25 |
| Example 9 | 91.6% | 81.6% | 77.4% | 4.21 |

In Table 1, 'vent' means that when the inner pressure of the battery was sufficiently high to severely threat the safety of the battery, the inner gas was discharged out by a pressure release tool provided in the battery. This is caused by excessive gas generation.

Referring to the above table, it is found that the batteries including a non-aqueous electrolyte solution containing difluorotoluene of the chemical formula 1 according to examples had a significant reduction in thickness change under overcharge conditions, when compared with batteries including a non-aqueous electrolyte solution containing other halogen-containing toluene according to comparative examples. In particular, this effect was more prominent when the position of fluorine is any one of 2,5-, 3,4-, and 3,5-.

Meanwhile, excessive gas was generated in the batteries additionally containing a compound having a lower oxidation potential than difluorotoluene according to comparative examples 8 to 10, and they were marked as 'vent'.

What is claimed is:

1. A lithium secondary battery, comprising:
   an anode;
   a cathode; and
   a non-aqueous electrolyte solution, comprising:
   a lithium salt, an organic solvent, and
   difluorotoluene, represented by the following chemical formula 1, having the lowest oxidation potential among components of the non-aqueous electrolyte solution:

<Chemical formula 1>

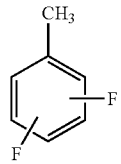

where the position of fluorines is at least one selected from the group consisting of 2,3-, 2,4-, 2,5-, 2,6-, 3,4-, and 3,5-, and wherein the content of difluorotoluene is 1 to 15 weight % per the total weight of the non-aqueous electrolyte solution.

2. The lithium secondary battery according to claim 1, wherein the position of fluorines of the above chemical formula 1 is at least one selected from the group consisting of 2,5-, 3,4-, and 3,5-.

3. The lithium secondary battery according to claim 1, wherein the organic solvent is a carbonate-based organic solvent.

4. The lithium secondary battery according to claim 3, wherein the carbonate-based organic solvent is a mixture of cyclic carbonate and linear carbonate.

5. The lithium secondary battery according to claim 4, wherein the cyclic carbonate is at least one selected from the group consisting of ethylene carbonate, propylene carbonate, fluoroethylene carbonate, and butylene carbonate, and the linear carbonate is at least one selected from the group consisting of dimethyl carbonate, diethyl carbonate, methylethyl carbonate, methylpropyl carbonate, and dipropyl carbonate.

6. The lithium secondary battery according to claim 1, wherein the lithium salt is at least one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_8$.

7. The lithium secondary battery according to claim 1, said non-aqueous electrolyte solution further comprising:
    any one selected from the group consisting of vinylene carbonate, a sultone-based compound, and mixtures thereof.

8. The lithium secondary battery according to claim 7, wherein the sultone-based compound is 1,3-propane sultone.

9. A non-aqueous electrolyte solution for a lithium secondary battery comprising a lithium salt and an organic solvent, the non-aqueous electrolyte solution comprising:
    difluorotoluene, represented by the following chemical formula 1, having the lowest oxidation potential among components of the non-aqueous electrolyte solution:

<Chemical formula 1>

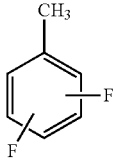

where the position of fluorines is at least one selected from the group consisting of 3,4- and 3,5-, wherein the content of the difluorotoluene is 1 to 15 weight % per total weight of the non-aqueous electrolyte solution.

\* \* \* \* \*